Feb. 20, 1968      W. R. SHAW      3,369,864
PRODUCTION OF ANHYDROUS MAGNESIUM CHLORIDE
Filed July 28, 1965
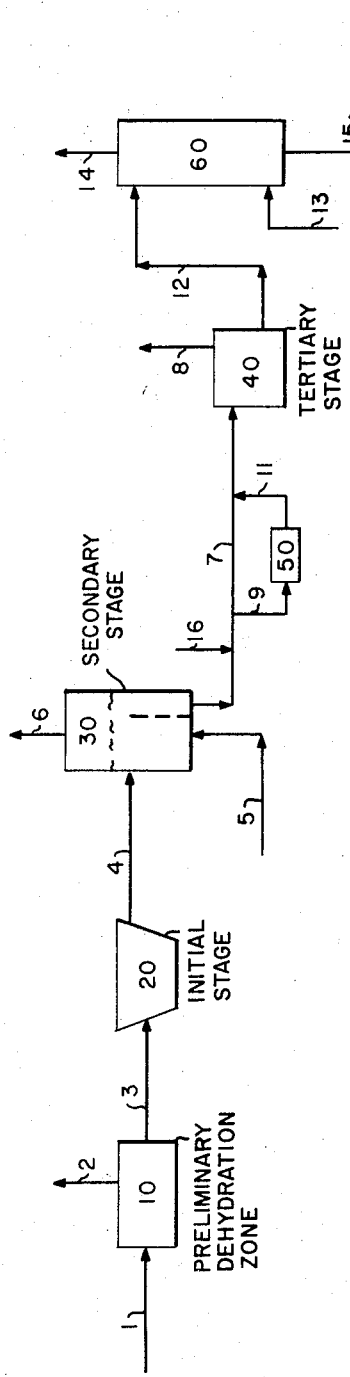
FIGURE-I
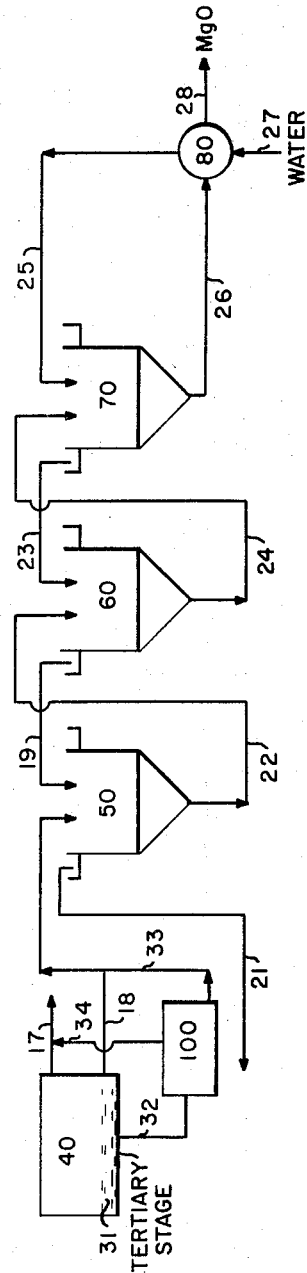
FIGURE-II
Walter R. Shaw      Inventor
By W. O. T Heilman
Patent Attorney

United States Patent Office 3,369,864
Patented Feb. 20, 1968

3,369,864
PRODUCTION OF ANHYDROUS MAGNESIUM CHLORIDE
Walter R. Shaw, Mountain Lakes, N.J., assignor to Esso Research and Engineering Company, a corporation of Delaware
Filed July 28, 1965, Ser. No. 475,544
7 Claims. (Cl. 23—91)

ABSTRACT OF THE DISCLOSURE

A three-stage method for the dehydration of magnesium chloride wherein in a first stage a solution of magnesium chloride is concentrated in a manner to remove a portion of the water of hydration; in a second stage the concentrated solution is treated to remove additional water so as to produce solid particles of magnesium chloride containing a minor amount of water of hydration, and in a third stage the magnesium chloride particles are melted and the remainder of the water removed.

---

The present invention is broadly concerned with the purification and dehydration of magnesium chloride so as to produce a high quality anhydrous magnesium chloride product, which may be further processed as, for example, in an electrolytic cell. The invention is more specifically concerned with a particular technique for the dehydration of magnesium chloride utilizing a plurality of integrated processing zones and stages wherein the last traces of water are removed to produce a product from which high quality anhydrous magnesium chloride can be obtained. In accordance with one specific adaptation of the present invention, water of hydration is removed from magnesium chloride in three stages, in which the magnesium chloride is present in the first stage in solution, wherein the magnesium chloride is present in the second stage as a solid phase and wherein the last traces of water of hydration are removed in a third stage wherein the magnesium chloride is in the fluid phase.

It is known in the art that naturally occurring magnesium chloride generally contains associated therewith about 6 molecules of water of hydration ($MgCl_2 \cdot 6H_2O$). It is also known in the art that by general dehydration processes it is possible to remove about four molecules of water without securing excessive undesirable side reactions. It has now been discovered that if a plurality of integrated processing zones and stages are utilized and that if particular techniques are utilized, the water of hydration can be effectively removed to produce a very high quality product. The process of the present invention may be more fully understood by reference to the drawings illustrating embodiments of the same.

FIGURE I illustrates an adaptation of the invention wherein the anhydrous magnesium chloride from the tertiary stage is passed to a chlorination zone to convert the magnesium oxide to magnesium chloride. FIGURE II illustrates an embodiment of the invention wherein anhydrous magnesium chloride, free of magnesium oxide, is removed as a first stream from the tertiary stage, and a slurry of magnesium chloride and magnesium oxide is removed as a second stream from the tertiary stage. This latter stream is then processed with water to separate the magnesium oxide from the resulting aqueous magnesium chloride which is preferably recycled to the stream.

Referring specifically to FIGURE I, a saturated brine solution is introduced into a preliminary dehydration zone 10 by means of line 1. It is preferred that the brine solution contain about 33% by weight magnesium chloride which is substantially saturated at ambient temperature. The temperature in zone 10, which is at atmospheric pressure, is in the range from about 280° to 300° F., preferably about 290° F. Under these conditions water will be removed from the brine solution by means of line 2.

A more concentrated brine solution is removed from preliminary dehydration zone 10 by means of line 3, and introduced into initial dehydration stage 20 wherein some of the water of hydration is removed. The concentrated brine solution removed from zone 10 by means of line 3 and introduced into initial stage 20 contains some free water. Zone 20 may be any type of heating stage as, for example, a heating kettle, which is maintained at the desired temperature by means of a steam coil or equivalent means. The temperature maintained in stage 20 is in the range from about 350° to 370° F., as, for example, about 360° F. Stage 20 is maintained at about atmospheric pressure. In general, temperature conditions in initial stage 20 and the time of residence are adjusted to produce an aqueous solution having a magnesium chloride concentration of about 53% by weight. Under certain conditions it may be desirable to combine a preliminary dehydration zone 10 and initial stage of dehydration 20 into a single operation. This combination operation would reduce a solution having a greater than 6 water of hydration to a solution having from about 4.6 to 4.8 water of hydration.

A molten, fused salt dissolved in the water of hydration (from about 4.6 to 4.8 water of hydration), is withdrawn from stage 20 by means of line 4 and introduced into a secondary dehydration stage 30 which, in essence, is a conventional fluidized solids bed operation. The temperature maintained in secondary dehydration stage 30 is below the melting point of the magnesium chloride and is preferably in the range of from about 950° to 1200° F. as, for example, about 1100° F. It is to be understood that the secondary stage may comprise one or more secondary stages wherein lower temperature conditions are maintained in the initial stage and that the above-specified temperatures are conditions for the last stage.

The fluidizing gas may be any inert gas as, for example, products of combustion such as carbon dioxide, nitrogen, and the like. The fluidizing gases are introduced into stage 30 by means of line 5 and withdrawn by means of line 6 along with the water of hydration which is removed from the magnesium chloride fluidized solid particles. One method of introducing the molten solution of magnesium chloride into secondary stage 30 is by means of spray nozzles positioned below the interface between the dense phase and the dilute phase.

Solid particles of magnesium chloride, containing less than two molecules of combined water per molecule of magnesium chloride, are withdrawn from stage 30 by conventional means and then passed into tertiary dehydration stage 40 by means of line 7. Stage 40 is preferably an electrically-heated, resistance-type fusion furnace. The magnesium chloride solid particles withdrawn from stage 30 contain associated therewith generally about 0.5 $H_2O$ of hydration. The temperature conditions maintained in tertiary dehydration stage 40 are high enough to maintain the magnesium chloride in the liquid phase. The temperature maintained is above about 1306° F. Generally, these temperatures are in the range from about 1400° to 1500° F., as, for example, about 1450° F. Some magnesium oxide solid particles are present in the liquid magnesium chloride. Under these conditions the remaining traces of water of hydration are removed from fusion furnace or tertiary stage 40 by means of line 8. In accordance with one adaptation of the present invention, the particles removed from tertiary stage 30 are passed through a briquetting zone 50 by means of lines 9 and 11 wherein these particles are compacted to produce briquettes as, for example, nominally ¾ to 1¼ inches in size. This prevents the accumulation of relatively small, solid particles on the surface of the liquid in fusion furnace 40.

Relatively small amounts of sodium chloride, calcium chloride and calcium fluoride, prior to introduction, are added by means of line 16 intermediate to the secondary and tertiary stages. The amounts added are, for example, to have from about 1 to 3% of sodium chloride present, about 1 to 3% of calcium chloride present, and about 0.01 to 0.5% by weight of calcium fluoride present in the feed to the tertiary stage.

The product of tertiary stage 40, comprising anhydrous magnesium chloride and magnesium oxide, may be then further processed by either one of two techniques. In accordance with a first technique, the molten magnesium chloride containing magnesium oxide is introduced into a chlorination zone 60 by means of line 12. Chlorine is introduced into zone 60 by means of line 13 and reaction gases are removed overhead by means of line 14. An anhydrous magnesium chloride product, substantially free of magnesium oxide is removed by means of line 15 and further handled as desired as, for example, passed to an electrolytic cell. While the carbon required in zone 60 (sufficient carbon to remove oxygen associated with MgO and $MgSO_4$ entering the chlorinator), may be introduced at any point, it has been found that when using this first technique very desirable results are secured when the carbon is introduced by means of line 16, particularly when the magnesium chloride is briquetted in zone 50. A very desirable and effective distribution of the carbon particles is thus secured.

A second technique for the handling of the product from fusion furnace or tertiary dehydration stage 40 is illustrated by FIGURE II. The process steps prior to the fusion furnace or tertiary stage 40 in FIGURE II are similar to those described with respect to FIGURE I. (No carbon added.) However, under certain conditions when the technology depicted by FIGURE II is utilized, it may be desirable to add sufficient carbon to the fusion furnace feed to reduce and/or eliminate the $SO_4{}_=$ content of the furnace product. Temperature and time conditions in stage 40 are adapted to produce a lower phase slurry 31 which contains a relatively high concentration of magnesium chloride layer substantially free of magnesium oxide particles. The amount of magnesium oxide present in the slurry is in the range from about 20 to 30% by weight, for example, about 25% by weight. The anhydrous magnesium chloride, free of magnesium oxide particles, is removed from fusion furnace 40 by means of line 17 and further handled as desired as, for example, as feed to an electrolytic cell. It is to be understood that the entire product from the tertiary stage may be passed to a settling zone rather than permitting the phases to separate in the tertiary stage. This adaptation is illustrated in FIGURE II wherein the entire product is removed from tertiary stage 40 by means of line 32 and passed to settling zone 100. The lower slurry is removed from settling zone 100 by means of line 33 while the clarified magnesium chloride layer is removed by means of line 34.

The slurry comprising magnesium oxide particles in magnesium chloride is introduced into a three-stage washing system wherein the same is contacted with water to extract the magnesium chloride. The slurry is introduced into initial step 50 by means of line 18 and water containing dissolved magnesium chloride is introduced by means of line 19. The magnesium chloride solution, free of magnesium oxide is withdrawn from initial step 50 by means of line 21 from, and preferably recycled to, the preliminary dehydration zone 10. An aqueous solution of magnesium chloride containing magnesium oxide is withdrawn from zone 50 by means of line 22 and introduced into secondary step 60 where the same is mixed with water containing some dissolved magnesium chloride, which is introduced by means of line 23. An aqueous solution is withdrawn from step 60 by means of line 19 and introduced into step 50. The magnesium oxide is withdrawn from secondary step 60 by means of line 24 and introduced into tertiary step 70 where it is mixed with water containing some magnesium chloride introduced by means of line 25. The magnesium oxide is withdrawn from step 70 by means of line 26 and passed to filter 80 wherein the same is washed with fresh water introduced by means of line 27. The magnesium oxide, substantially free of magnesium chloride, is withdrawn from filter 80 by means of line 28 and further handled as desired. It is to be understood that under certain operating conditions less washing steps may be utilized.

The present process may be more readily understood by the following example illustrating the same.

*Example*

An operation conducted in accordance with the present invention will have feed compositions to the respective zones and stages about as shown in the following Table I.

TABLE I

| Feed to Zone 10 | Feed to Dehydration Stages, Percent | | | Product to Zone 60 via Line 12 | Product from Zone 60 via Line 15 [2] |
| --- | --- | --- | --- | --- | --- |
| | 20 Initial | 30 Secondary | 40 Tertiary [1] | | |
| KCl | 0.4 | 0.5 | 0.6 | 1.4 | 1.5 | 1.3 |
| NaCl | 0.3 | 0.4 | 0.5 | 1.8 | 2.1 | 1.9 |
| $MgCl_2$ | 33.4 | 43.2 | 53.0 | 80.5 | 80.1 | 94.2 |
| $MgSO_4$ | 0.1 | 0.1 | 0.1 | 0.2 | 0.2 | 0.0 |
| MgO | 0.0 | 0.0 | 0.0 | 6.9 | 11.5 | [3] 0.5 |
| Water: | | | | | | |
| Combined | 37.9 | 48.9 | 45.8 | 7.0 | | |
| Free | 27.9 | 6.9 | 0 | 0 | | |
| Total | 65.8 | 55.8 | 45.8 | 7.0 | 0.0 | 0.0 |
| $CaCl_2$ | | | | 2.1 | 2.3 | 2.0 |
| $CaF_2$ | | | | 0.0 | 0.1 | 0.1 |
| Total | 100.0 | 100.0 | 100.0 | 100.0 | [4] 97.8 | 100.0 |
| Temp. in Zone, °F | 290 | 348 | 1,100 | 1,400 | | |

[1] Includes added amounts of NaCl, $CaCl_2$, and $CaF_2$.
[2] Product from zone 40, line 17, substantially the same.
[3] Maximum.
[4] If chlorinator is employed, a small amount of carbon will also be added sufficient to remove oxygen associated with MgO and $MgSO_4$ entering chlorinator.

What is claimed is:

1. Process for the removal of water of hydration from hydrous magnesium chloride containing about six molecules of water which comprises treating an aqueous brine solution of magnesium chloride in an initial stage at a temperature in the range from about 350° to 370° F. at atmospheric pressure adapted to remove a portion of the water of hydration and secure a partially dehydrated liquid magnesium chloride containing from about 4.6 to about 4.8 molecules of water, treating the partially dehydrated magnesium chloride in a secondary stage at a temperature in the range from about 950° F. to 1200° F. and at atmospheric pressure to remove additional quantities of water and to produce solid magnesium chloride particles containing less than about two molecules of water, subjecting the magnesium chloride particles in a tertiary stage to a temperature in the range from about 1400° to 1500° F. to produce molten magnesium chloride completely free of the last traces of the water of hydration.

2. Process as defined by claim 1 wherein said secondary stage is a fluid bed operation wherein the partially dehydrated magnesium chloride is sprayed into a fluidized zone to produce solid, fluidized particles.

3. Process as defined by claim 1 wherein the molten magnesium chloride solution from said tertiary stage is further treated in a chlorination stage with chlorine and carbon to convert magnesium oxide to magnesium chloride.

4. Process as defined by claim 3 wherein the required carbon is introduced into the magnesium chloride prior to said chlorination stage.

5. Process as defined by claim 4 wherein said magnesium chloride particles are briquetted after the addition of the carbon and prior to said tertiary stage.

6. Process as defined by claim 1 wherein the temperature and time conditions in said tertiary stage are adapted to produce an upper, clarified layer of magnesium chloride which is withdrawn as an anhydrous magnesium chloride product and to produce a lower slurry layer containing magnesium oxide particles.

7. Process as defined by claim 6 wherein said slurry is contacted with water to dissolve the magnesium chloride and wherein the solution is separated from the magnesium oxide particles and recycled to the system.

References Cited

UNITED STATES PATENTS

| | | | |
|---|---|---|---|
| 1,497,201 | 6/1924 | Wheat | 23—91 |
| 1,498,833 | 6/1924 | Bull | 23—91 |
| 1,749,854 | 3/1930 | Staib | 23—91 |
| 1,871,428 | 8/1932 | Smith | 23—91 |
| 1,923,594 | 8/1933 | Suchy et al. | 23—91 |
| 1,940,620 | 12/1933 | Blumenfeld | 23—91 |
| 2,201,206 | 5/1940 | Schmid et al. | 23—91 |
| 2,356,118 | 8/1944 | Pidgeon | 23—91 |
| 2,406,935 | 9/1946 | Wood et al. | 23—91 |
| 2,417,772 | 3/1947 | Marek | 23—91 |
| 3,067,006 | 12/1962 | Ebert et al. | 23—91 |

FOREIGN PATENTS

| | | |
|---|---|---|
| 582,332 | 11/1946 | Great Britain. |
| 582,333 | 11/1946 | Great Britain. |

OSCAR R. VERTIZ, *Primary Examiner.*

EDWARD STERN, *Examiner.*